United States Patent
Kim et al.

(10) Patent No.: US 9,904,794 B2
(45) Date of Patent: Feb. 27, 2018

(54) PROCESSING SECURE DATA

(71) Applicant: Samsung Electronics Co., Ltd., Suwon-si, Gyeonggi-do (KR)

(72) Inventors: Yong Chul Kim, Seoul (KR); Yang Soo Lee, Yongin-si (KR); Moon Soo Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 14/858,624

(22) Filed: Sep. 18, 2015

(65) Prior Publication Data

US 2016/0092376 A1     Mar. 31, 2016

(30) Foreign Application Priority Data

Sep. 25, 2014   (KR) .................. 10-2014-0128664

(51) Int. Cl.
*G06F 12/00*     (2006.01)
*G06F 21/62*     (2013.01)

(52) U.S. Cl.
CPC .................. *G06F 21/6218* (2013.01)

(58) Field of Classification Search
None
See application file for complete search history.

(56) References Cited

U.S. PATENT DOCUMENTS

| | | |
|---|---|---|
| 8,375,221 B1 | 2/2013 | Thom et al. |
| 8,931,108 B2 | 1/2015 | Sharp et al. |
| 2012/0066696 A1 | 3/2012 | Dasgupta et al. |
| 2013/0031374 A1 | 1/2013 | Thom et al. |
| 2013/0159729 A1 | 6/2013 | Thom et al. |
| 2014/0237609 A1 | 8/2014 | Sharp et al. |

*Primary Examiner* — John A Lane
(74) *Attorney, Agent, or Firm* — Jefferson IP Law, LLP (57) ABSTRACT

An electronic device is provided. The electronic device includes a first control module including a normal module and a security module, and a second control module distinct from the first control module. The normal module sets a secure memory which the security module and the second control module access, and the security module determines validity of the set secure memory.

20 Claims, 6 Drawing Sheets

PROCESSING SECURE DATA

CROSS-REFERENCE TO RELATED APPLICATION(S)

This application claims the benefit under 35 U.S.C. § 119(a) of a Korean patent application filed on Sep. 25, 2014 in the Korean Intellectual Property Office and assigned Serial number 10-2014-0128664, the entire disclosure of which is hereby incorporated by reference.

TECHNICAL FIELD

The present disclosure relates to a method for providing a high security state of data.

BACKGROUND

A heterogeneous multi-core embedded system in which a variety of processing units is embedded may be being utilized for various electronic devices. For example, an electronic device may include processing units, such as a graphical processing unit, a digital signal processor, and the like, including a plurality of parallel cores, as well as a central processing unit (CPU).

Meanwhile, an electronic device may use living body recognition information of a user, for example, technology, such as fingerprint recognition or iris recognition to provide higher security as compared with a convention password (or personal identification number (PIN)) manner.

In general, an electronic device may set security on a specific processor or a specific memory area, thereby making it possible to somewhat assure stability with respect to an operation at an area to which security is set. However, in the case where an electronic device uses different kinds of processing devices to improve task efficiency, it may be impossible or difficult to assure security of data in processing data between different kinds of processing devices.

Therefore, a need exists for a method for providing a high security state of data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for providing a high security state of data while effectively processing services, which necessitate both complicated processing and a fast response, using different kinds of processors.

In accordance with an aspect of the present disclosure, an electronic device is provided. The electronic device includes a first control module including a normal module and a security module, and a second control module distinct from the first control module. The normal module sets a secure memory which the security module and the second control module access, and the security module determines validity of the set secure memory.

In accordance with another aspect of the present disclosure, a secure data processing method of an electronic device which includes a first control module and a second control module, the first control module including a normal module and a security module distinguishable from each other is provided. The method includes setting a secure memory by the normal module, determining validity of the secure memory by the secure memory, writing secure data at the secure memory, requesting the second control module to process at least a portion of the written secure data, writing a processing result on the at least a portion of the secure data at the secure memory, and providing a control signal, based on the processing result, to the normal module by the security module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the disclosure disclosed herein, the expressions "have", "may have", "include" and "comprise", or "may include" and "may comprise" used herein indicate existence of corresponding features (e.g., elements, such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices.

According to various embodiments of the present disclosure, an electronic device may be a flexible electronic device. In addition, electronic devices according to various embodiments of the present disclosure are not limited to the above-mentioned devices, and may include new electronic devices according to technology development.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

Figure 1:
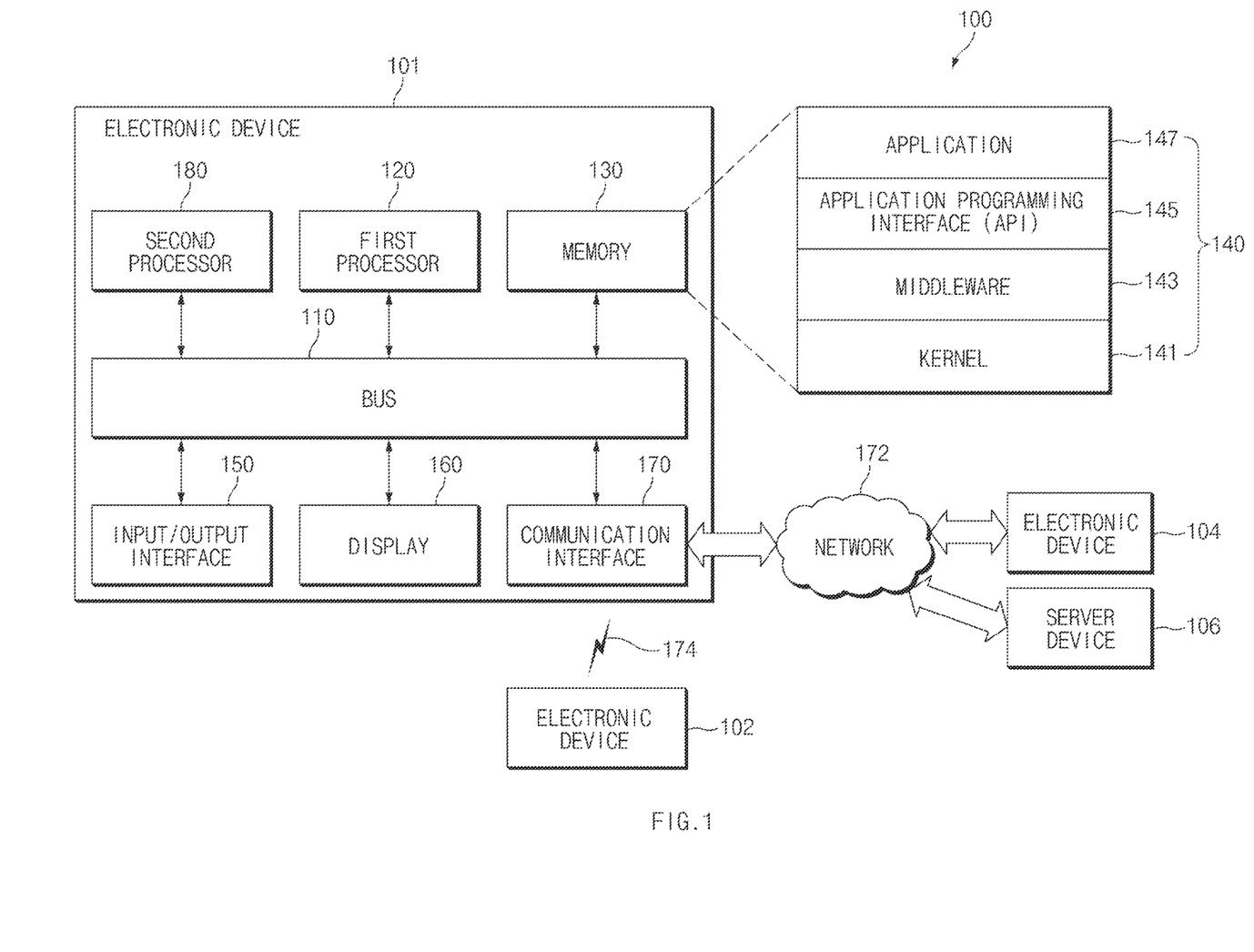
FIG. 1 is a diagram illustrating an electronic device in a network environment according to various embodiments of the present disclosure.

FIG. 1 is a diagram illustrating an electronic device in a network environment according to various embodiments of the present disclosure.

Referring to FIG. 1, an electronic device 101 in a network environment 100 is illustrated according to various embodiments of the present disclosure. The electronic device 101 may include a bus 110, a first processor 120, a memory 130, an input/output (I/O) interface 150, a display 160, a communication interface 170, and a second processor 180.

According to various embodiments of the present disclosure, the electronic device 101 may not include at least one of the above-described components or may further include other component(s).

The bus 110 may interconnect the above-described components 110 to 180 and may be a circuit for conveying communications (e.g., a control message and/or data) among the above-described components.

The first processor 120 may include one or more of a CPU, an application processor (AP), or a communication processor (CP). The first processor 120 may perform, for example, data processing or an operation associated with control or communication of at least one other component(s) of the electronic device 101.

According to various embodiments of the present disclosure, the first processor 120 may be understood as being a main processor or a main core processor. For example, a processing module which is capable of controlling operations of other components (e.g., various modules, interfaces, or various processing devices, such as a second processor 180) included in the electronic device 101 may be understood as the first processor 120. Furthermore, the first processor 120 may be logically divided into a security module and a normal module. For example, the security module and the normal module may be logically divided using virtualization manner or a method, capable of tightening security through isolation of code and data, similar to the virtualization manner. A characteristic of the first processor 120 associated with the above description will be described with reference to FIG. 2.

The second processor 180 may be a processor different in kind from the first processor 120. For example, the first processor 120 may be a CPU, and the second processor 180 may be a graphics processing unit (GPU), a digital signal processor (DSP), a field-programmable gate array (FPGA), a sensor core, and the like.

The memory 130 may include a volatile and/or nonvolatile memory. The memory 130 may store instructions or data associated with at least one other component(s) of the electronic device 101. According to various embodiments of the present disclosure, the memory 130 may store software and/or a program 140. The memory 130 may include, for example, a kernel 141, a middleware 143, an application programming interface (API) 145, and/or an application (or an application program) 147. At least a portion of the kernel 141, the middleware 143, or the API 145 may be called an "operating system (OS)".

According to various embodiments of the present disclosure, the memory 130 may be divided into a secure memory area and a normal memory area. For example, the first processor 120 may assign a portion of the memory 130 to the secure memory area. According to some embodiments of the present disclosure, the memory 130 may include a plurality of memories physically isolated from each other, and the first processor 120 may assign at least one of the plurality of memories or a portion of at least one memory to the secure memory area.

If a portion of the memory 130 is set to the secure memory area, an access to the secure memory area may be selectively restricted. For example, a secure module of the first processor 120 and the second processor 180 may access the secure memory area, while a normal module of the first processor 120 may not access the secure memory area.

The kernel 141 may control or manage system resources (e.g., the bus 110, the first processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 101 so as to control or manage system resources.

The middleware 143 may perform a mediation role such that the API 145 or the application program 147 communicates with the kernel 141 to exchange data. Furthermore, with regard to task requests received from the application program 147, for example, the middleware 143 may perform a control (e.g., scheduling or load balancing) on a task request using a method of assigning the priority, which makes it possible to use a system resource (e.g., the bus 110, the first processor 120, the memory 130, or the like) of the electronic device 101, to at least one application.

The API 145 may be an interface through which the application program 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to other component(s) of the electronic device 101. Furthermore, the I/O interface 150 may output an instruction or data, received from other component(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a portion of a user's body.

The communication interface 170 may establish communication between the electronic device 101 and an external electronic device (e.g., a first external electronic device 102, a second external electronic device 104, or a server 106). For example, the communication interface 170 may be connected to a network 172 through a wireless communication or a wired communication to communicate with the external device (e.g., the second external electronic device 104 or the server 106). In another example, the communication interface 170 may be connected to a network 174 through a wireless communication or a wired communication to communicate with the external device (e.g., the first external electronic device 102).

The wireless communication may include at least one of, for example, long term evolution (LTE), LTE advanced (LTE-A), code division multiple access (CDMA), Wideband CDMA (WCDMA), universal mobile telecommunications system (UMTS), wireless broadband (WiBro), global system for mobile communications (GSM), or the like, as cellular communication protocol. The wired communication may include at least one of, for example, a universal serial bus (USB), a high definition multimedia interface (HDMI), a recommended standard-132 (RS-132), or a plain old telephone service (POTS). The network 162 may include at least one of telecommunications networks, for example, a computer network (e.g., LAN or WAN), an internet, or a telephone network.

Each of the first external electronic device 102 and a second external electronic device 104 may be a device of which the type is different from or the same as that of the electronic device 101. According to an embodiment of the present disclosure, the server 106 may include a group of one or more servers. According to various embodiments of the present disclosure, all or a part of operations that the electronic device 101 will perform may be executed by another or plural electronic devices (e.g., the first external electronic device 102 and the second external electronic device 104 and the server 106). According to an embodiment of the present disclosure, in the case where the electronic device 101 executes any function or service automatically or in response to a request, the electronic device 101 may not perform the function or the service internally, but, alternatively additionally, it may request at least a portion of a function associated with the electronic device 101 at other device (e.g., the first external electronic device 102 or the second external electronic device 104 or the server 106). The other electronic device (e.g., the first external electronic device 102 or the second external electronic device 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
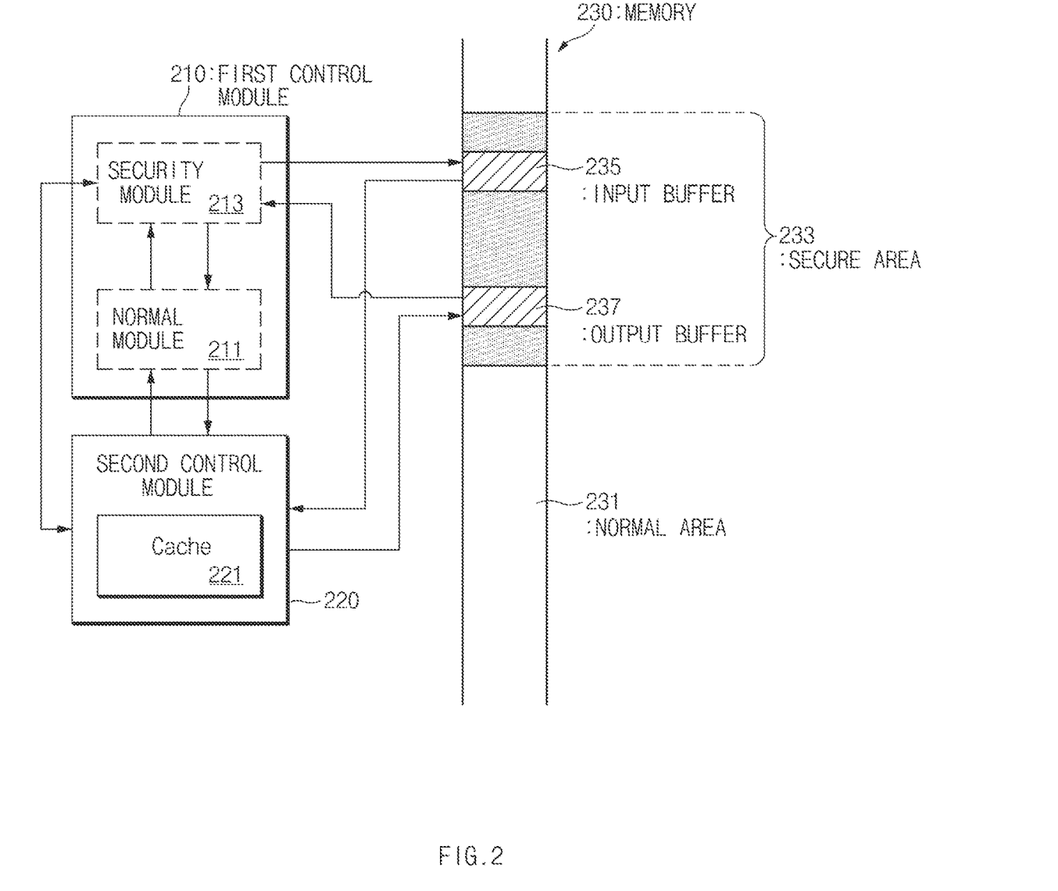
FIG. 2 is a diagram schematically illustrating a processor-memory structure of an electronic device according to various embodiments of the present disclosure.

FIG. 2 is a diagram schematically illustrating a processor-memory structure of an electronic device according to various embodiments of the present disclosure.

Referring to FIG. 2, a portion of a hardware configuration of an electronic device is illustrated according to various embodiments of the present disclosure. For example, a configuration of hardware described with reference to FIG. 2 may be understood as being a configuration corresponding to the first processor 120, the second processor 180, and the memory 130 of the electronic device 101 illustrated in FIG. 1.

An electronic device of FIG. 2 may include a first control module 210 (e.g., the first processor 120), a second control module 220 (e.g., the second processor 180), and a memory 230 (e.g., the memory 130). According to various embodiments of the present disclosure, the first control module 210 and the second control module 220 may be implemented in a system on chip (SoC). For example, an AP for a mobile device may be implemented with an integrated chip including a CPU (e.g., corresponding to a first control module 210), a GPU, a DSP, a sensor core, an image signal processor (ISP) (e.g., corresponding to a second control module 220).

According to various embodiments of the present disclosure, the first control module 210 may correspond to a physical process core. The first control module 210 may be divided into a secure area and a normal area. CPU registers and page table-associated registers of the secure and normal areas may be isolated from each other. For example, addresses of a table for translation between virtual addresses and physical addresses may be differently set, thereby making it possible for the secure and normal areas to see different address spaces. According to various embodiments of the present disclosure, the first control module 210 may be understood as including a normal module 211 operating in a normal area 231 (or a normal mode) and a security module 213 operating in a secure area (or a secure mode).

According to various embodiments of the present disclosure, the normal module 211 may set a portion of the memory 230 to a secure area 233. If the secure area 233 is set, the normal module 211 and a processor which is not allowed to access the secure area 233 by the normal module 211 may not access the secure area 233. A page fault may occur when the normal module 211 or a processor not allowed to access an area (e.g., the memory 230) accesses the secure area 233. For example, after setting the secure area 233, the normal module 211 may access only the normal area 231 of the memory 230.

The normal module 211 may request the security module 213 to process data associated with security. The security module 213 may process data associated with security, for example, living body information of a user, authentication information associated with finance payment, sensitive data, and the like. For example, the normal module 211 may request the security module 213 to unlock the electronic device 101. The security module 213 may execute a security application and may determine whether an unlock pattern or a password from a user corresponds to an unlock pattern or a password of the electronic device 101. The normal module 211 may unlock or maintain a lock state of the electronic device 101, based on a determination provided from the security module 213.

The normal module 211 may convey a task request and a memory address between the security module 213 and the second control module 220. According to various embodiments of the present disclosure, the security module 213 may entrust processing on a portion of secure data to the second control module 230. For example, the security module 213 (e.g., a secure area of a CPU) may request the second control module 220 (e.g., a GPU including a plurality of cores for parallel processing) to process a compute-intensive portion of an application and may process the remaining code.

A variety of information necessitating security may be used in an electronic device. Living body information, such as fingerprint or iris of a user, as well as a four-digit password may be used in an electronic device. It may be relatively simple to process some information (e.g., a password), but other information (e.g., living body information) may necessitate very complicated processing. A relatively long time may be taken to perform complicated processing, but a user may want a fast response. For example, a user may want to unlock an electronic device or to complete authentication for payment substantially at the same time (e.g., within 0.5 ms) when a user touches a finger on an electronic device. A user may want prompt iris recognition in seeing a lens, even though the following precise operations are performed: capturing an eye of the user, performing image signal processing for determining an iris from the captured image, and determining whether the captured iris image is matched with a registered iris image of the user.

According to various embodiments of the present disclosure, a task necessitating high complexity may be assigned to any other processor, in particular, a processor (e.g., a processor including cores of which the number is more than a CPU) dedicated for a corresponding task or fit to perform a corresponding task for acceleration of parallel processing, thereby making it possible to provide a fast response together with processing on high security.

Various methods or devices disclosed herein may be applied to various processing, which is capable of maintaining security together with a processing speed being relatively faster (e.g., faster than a processing speed of a single processor or a main processor), as well as the above-described processing on living body recognition. For example, various embodiments of the present disclosure may be applied to an operation of a secure user interface (UI) or a security-associated TUI (e.g., a UI for inputting a password or personal information at a bank/finance-associated application) operating in a secure state (e.g., a secure mode). For example, since the TUI has various limits due to an operation on a secure OS and expresses only a simple UI, the TUI may communicate with various kinds of security processors, thereby causing an increase in transient computation. In this case, the second control module 220 (e.g., a GPU and the like) may be used to distribute computation, and various effects may be added to make it possible to implement a general UI (e.g., a UI implemented without limits associated with security). The above-described embodiment may be various and may be variously changed or modified without departing from the scope and spirit of the present disclosure.

According to various embodiments of the present disclosure, the security module 213 may request a task from the normal module 211 and may simultaneously transfer a memory address (e.g., a memory address of an input buffer 235) of the secure area 233, at which secure data is stored (or written), and a memory address (e.g., a memory address of an output buffer 237) of the secure area 233, at which a task result is to be stored. The normal module 211 may provide the task request and the memory address to the second control module 220. Meanwhile, if a task entrusted by the security module 213 is completed, the second control module 220 may provide the normal module 211 with a response, indicating that the requested task is completed, and a memory address (e.g., a memory address of an output buffer 237) where a task result is stored. Since the security module 213 knows, in advance, a memory address at which a task result is to be stored, the second control module 220 may selectively transfer a memory address. For example, the second control module 220 may transfer only a memory address, associated with an area at which an actual task result is stored, from among memory addresses of the output buffer 237 or may not transfer a memory address. If receiving a response to the request and/or a memory address from the second control module 220, the normal module 211 may provide the received response and memory address to the security module 213. According to some embodiments of the present disclosure, however, a task request and a memory address may be directly exchanged between the security module 213 and the second control module 220.

The second control module 220 may be a module which is allowed to access the secure area 233 by the normal module 211. To process secure data, the second control module 220 may access the input buffer 235 to read (or obtain) the secure data. Furthermore, the second control module 220 may access the output buffer 237 to write (or store) a processed result.

The security module 213 may perform determination on secure data based on a result of processing directly executed by the security module 213 and/or a result of processing executed by the second control module 220 and may provide the determination result to the normal module 211. For example, the second control module 220 may write an analysis result on a fingerprint image at the output buffer 237 and may transfer an analysis complete message and a memory address of the output buffer 237 to the security module 213. The security module 213 may determine whether the analysis result written in the output buffer 237 corresponds to registered fingerprint data of a user and may provide the determination result (e.g., hit or mishit) to the normal module 211. The normal module 211 may perform the following additional operation, based on a result from the security module 213: unlocking/maintaining lock or payment approval/payment refusal. This will be described with reference to FIG. 4.

The first control module 210 and the second control module 220 may be different kinds of processes and may perform their own operations. For example, the second control module 220 may perform a normal operation (e.g., graphic processing, image signal processing, digital signal processing, detected data processing, and the like) of the second control module 220 as well as a task entrusted by the security module 213. The above-described processing task may be a normal task which does not necessitate security.

According to various embodiments of the present disclosure, the second control module 220 may use a cache memory 221 to prevent collision or mixing between its own processing and entrusted processing. For example, if the security module 213 entrusts a security processing task to the second control module 220, the second control module 220 may clear the cache memory 221 and may process the security processing task. Furthermore, if the security module 213 entrusts a security processing task to the second control module 220, the second control module 220 may complete a processing task at a secure task state (e.g., a secure mode). If a task is completed, the second control module 220 may clear the cache memory 221 to switch an operation manner into a normal task state (e.g., a normal mode). In addition, if a security processing task is entrusted, the second control module 220 may partition the cache memory 221 into a first area and a second area. The second control module 220 may perform its own processing task on the first area and may assign the second area for a security processing task.

According to various embodiments of the present disclosure, the second control module 220 may perform matching of synchronization to process a task entrusted from the security module 213. For example, the second control module 220 may set a priority of the entrusted processing to a first priority at a task queue waiting for processing. According to various embodiments of the present disclosure, the second control module 220 may first perform other processing in the order of requested tasks and may then perform the entrusted processing. The priority of processing may be adjusted by the second control module 220. However, the priority of processing may be adjusted by the first control module 210 (e.g., a security module 213 or a normal module 211).

Figure 3:
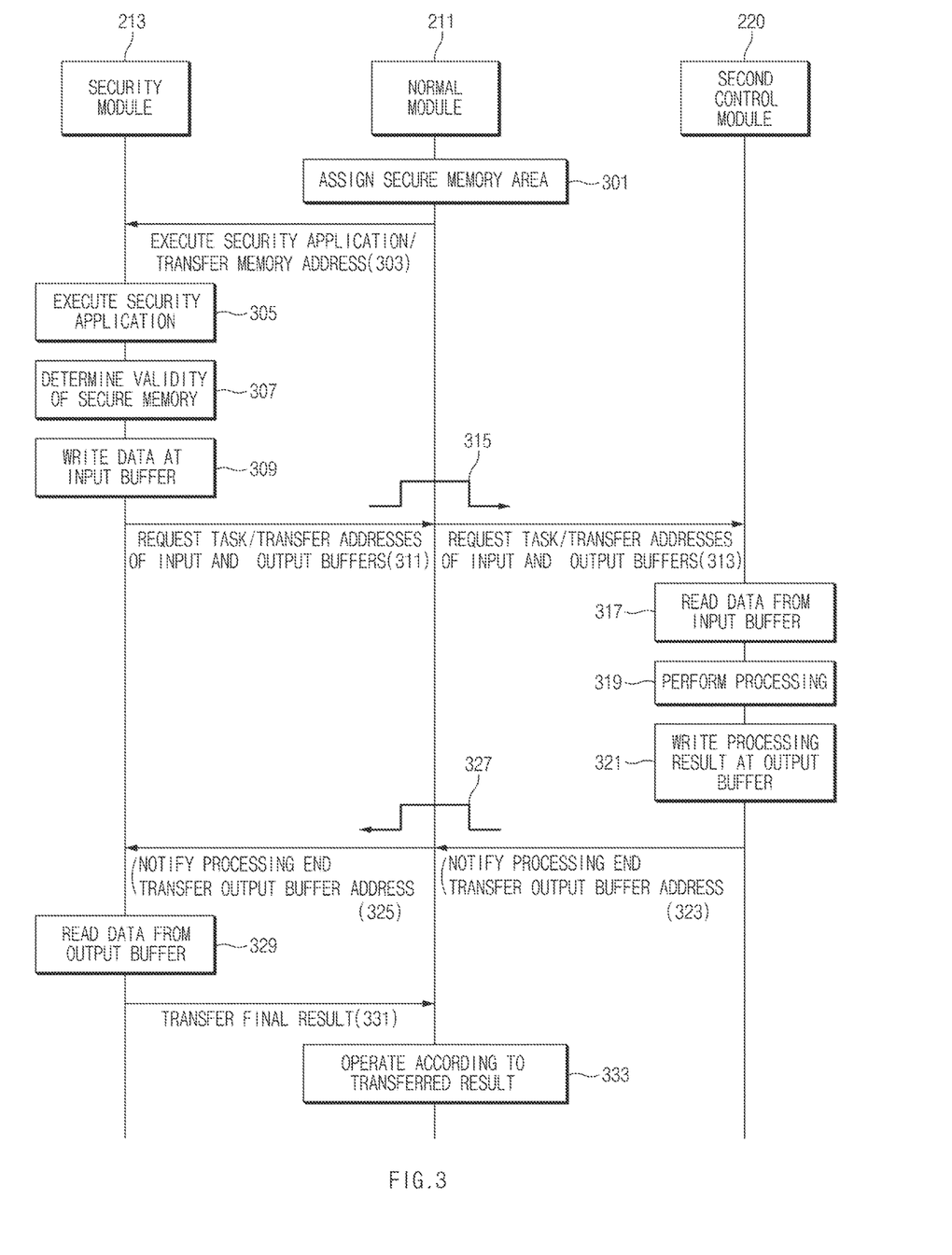
FIG. 3 is a diagram schematically illustrating a secure data processing method according to various embodiments of the present disclosure.

FIG. 3 is a diagram schematically illustrating a secure data processing method according to various embodiments of the present disclosure.

Referring to FIG. 3, in operation 301, a normal module 211 may assign a secure memory area. For example, the normal module 211 may assign a portion of a memory 130 or a memory 230, at least one of a plurality of memories, or a portion of at least one memory to the secure memory area.

Operation 301 may be triggered in various cases. For example, operation 301 may be triggered when there is executed an application (e.g., a normal application) or a function including a process associated with unlocking of an electronic device or electronic payment using user authentication information (e.g., a certificate, living body information, and the like). According to various embodiments of the present disclosure, a secure memory area of an electronic device (e.g., an electronic device 101) may be assigned in advance in a chip or product manufacturing level.

In operation 303, the normal module 211 may request a security module 213 to execute a security application and may transfer an address of the secure memory area assigned in operation 301. According to various embodiments of the present disclosure, the security application may be an application for processing data associated with security or executing a function associated with security and may not be shown to a user. For example, in the case of performing user authentication through fingerprint recognition, a normal application may request an operation (e.g., please touch a finger on a sensor) for fingerprint recognition from a user, and a security application may analyze an obtained fingerprint to determine whether the user authentication is successful. In this case, an operation of an application or an interface may not be provided to a user (to a display of an electronic device). The security application may transfer whether authentication is successfully performed, to a normal application using intent or the like, and the normal application may provide a UI corresponding to authentication success or failure.

In operation 305, the security module 213 may execute a security application based on a request in operation 303. In operation 307, the security module 213 may determine whether the secure memory area assigned in operation 301 is valid. Operation 305 and operation 307 may be performed sequentially or in parallel, or operation 307 may be performed before operation 305 is performed.

That the security module 213 determines validity of (or validate) a secure memory may have the following characteristics. For example, since the security module 213 and the normal module 211 are isolated from each other, even though an external user obtains authority of a root account, such as a root kit or modifies or changes an operating system using obtained authority, an operating system or a normal application may operate on the normal module 211 and may not access the security module 213. Nevertheless, hacking on the normal module 211 may be tried such that false information is transferred to the security module 213 as if a normal memory area is a secure memory area and a processed result of the security module 213 is stored at the normal memory area (i.e., a memory area transferred to the security module 213 as if being the secure memory area). However, in the case where the security module 213 determines validity of a memory in operation 307, it may be possible to determine whether a set memory area is the secure memory area or the normal memory area. If an area transferred to the secure memory area is determined as being the normal memory area, an additional operation may be stopped or an error/alarm message may be generated, thereby making it possible to escape from a hacking risk.

According to various embodiments of the present disclosure, determining of validity of a secure memory may be performed together with any operation or before/after any operation. For example, validity of the secure memory may be determined before the second control module 220 performs operation 317 (an operation for reading data from an input buffer), by adding an API which allows validity of the secure memory to be determined. Furthermore, it may be possible to determine validity of the secure memory before the security module 213 performs operation 329 (an operation for reading data an output buffer). According to various embodiments of the present disclosure, determining of validity of the secure memory may be performed whenever a control module (e.g., a normal module 211, a security module 213, a second control module 220, or the like) stores data at the secure memory or reads data therefrom.

Furthermore, the secure memory area may include an input buffer (e.g., an input buffer 235) and an output buffer (e.g., an output buffer 237). The input buffer may correspond to a memory area at which secure data which the security module 213 obtains (through a sensor and the like) is stored, and the output buffer may correspond to a memory area at which the second control module 220 stores a result of processing secure data. The security module 213 may determine whether a memory address corresponding to each buffer exists within the secure memory area, thereby preventing secure data from being stored at the normal memory area.

In operation 309, the security module 213 may write the obtained secure data (e.g., user fingerprint recognition data, iris data, and the like) at the input buffer in the secure memory.

In operation 311, the security module 213 may request a task on all or a portion of secure data written at the normal module 211 from the normal module 211. At this time, the security module 213 may transfer memory addresses of the input and output memories together. According to an embodiment of the present disclosure, in the case where the security module 213 requests processing on a portion of the secure data, there may be transferred a memory address of the input buffer at which the portion of the secure data is written. The normal module 211 may transfer a task request and a memory address transferred in operation 311 to the second control module 220. According to some embodiments of the present disclosure, the security module 213 may directly transfer the request and the memory address to the second control module 220.

In operation 317, the second control module 220 may read all or a portion of secure data from the input buffer, based on the memory address transferred in operation 313 or operation 315. In operation 319, the second control module 220 may performs requested processing with respect to all or a portion of the secure data thus read. In operation 321, the second control module 220 may write a processed result at the output buffer, based on the memory address transferred in operation 313 or operation 315.

If processing on the secure data is completed, in operation 323, the second control module 220 may provide the normal module 211 with notification that processing is ended. In this case, since the security module 213 knows a memory address of the output buffer in advance, the second control module 220 may selectively provide a memory address of the output buffer or may not provide the memory address thereof. According to some embodiments of the present disclosure, the second control module 220 may provide a memory address, at which a processing result is actually stored, from among received output memory addresses together with a response to the operation request.

According to various embodiments of the present disclosure, the second control module 220 may set or release a secure state before/after performing a secure task (e.g., operation 317, 319, or 321). The secure state may be set (e.g., set by operation 315 or operations 311 to 313) or released (e.g., released by a response to operation 327 or operations 323 to 325) by the first control module 210. Furthermore, the second control module 220 may set or release a secure state actively if there is determined that a secure task is entrusted or is completed.

The normal module 211 may provide the security module 213 with a response received in operation 323. In this case, if a memory address of the output buffer is transferred together with the response in operation 323, the normal module 211 may transfer the memory address and the response to the security module 213. If notification that processing is ended without information on a memory address is provided in operation 323, in operation 325, the normal module 211 may provide the notification without information on a memory address as a response to the task request.

In operation 329, the security module 213 may read data written at the output buffer. In operation 323 to operation 327, in the case where a memory address at which a processing result is written is provided to the security module 213, the security module 213 may search for only a memory area at which a processing result is actually written, thereby reducing a task time.

In operation 331, the security module 213 may provide the normal module 211 with a processing result of secure data, based on data written at the output buffer. With the above-described operations, it may be possible to obtain a processing result quickly using the security module 213 and the second control module 220 without allowing the normal module 211 to access the secure memory area.

In operation 333, the normal module 211 may perform an additional operation based on a result transferred in operation 331. For example, if a result on correspondence of living body data, such as a fingerprint or an iris, or user correspondence is provided as a result of analyzing secure data in operation 331, the normal module 333 may perform an operation, such as unlocking of an electronic device, payment, user authentication, or the like.

Figure 4:
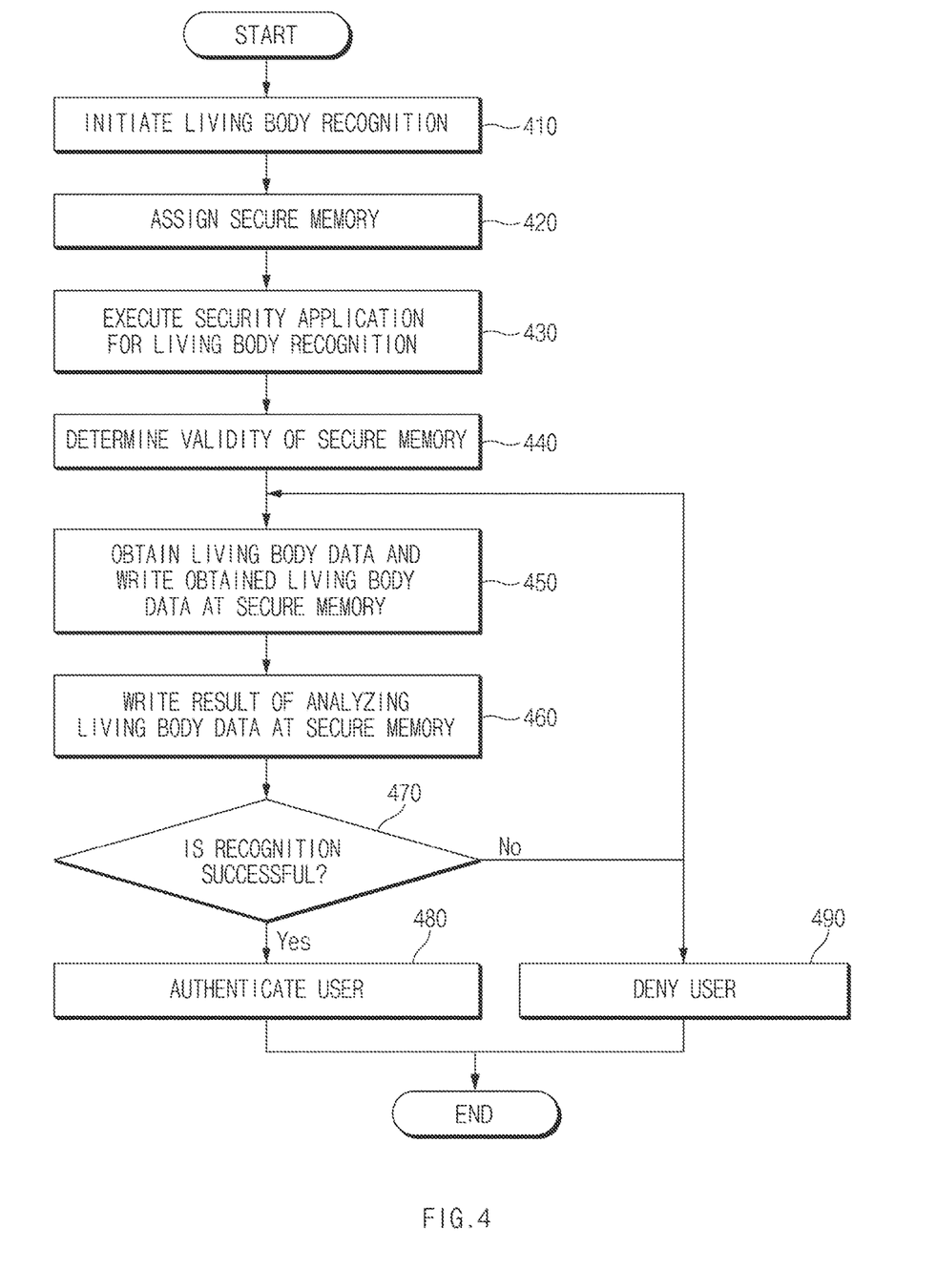
FIG. 4 is a diagram schematically illustrating a user authentication process using living body recognition, according to various embodiments of the present disclosure.

FIG. 4 is a diagram schematically illustrating a user authentication process using living body recognition, according to various embodiments of the present disclosure. FIG. 4 may be understood as being an embodiment of a method implemented using an electronic device described with reference to FIGS. 1 to 3. Even though a portion of the above description is omitted or changed, it may be possible to apply a corresponding description to an embodiment of FIG. 4.

Referring to FIG. 4, in operation 410, an electronic device may initiate a living body recognition process. For example, a normal module 211 may provide an UI for recognizing living body data of a user.

In operation 420, the normal module 211 may set a secure memory area at which data obtained by a security application is to be stored.

In operation 430, a security module 213 may execute a security application for obtaining living body data.

In operation 440, the security module 213 may verify validity of the secure memory area set by the normal module 211. If the secure memory area is determined in operation 440 as not being a valid secure memory area, a process of FIG. 4 may be terminated.

In operation 450, the security module 213 may recognize living body data (e.g., fingerprint, iris, or the like) inputted from a user and may store (or write) the recognized living body data at the secure memory area assigned in operation 420.

In operation 460, the electronic device may analyze the living body data and may store the analysis result at a secure memory.

Specifically, the security module 213 may entrust all or a portion of an analysis operation on living body data to a second processor 220, such as a GPU or the like. For example, the security module 213 may analyze data, which is stored at a first memory address, from among the obtained living body data and may request a second control module 220 to analyze data stored at a second memory address. According to an embodiment of the present disclosure, the first memory address and the second memory address all may be included in the secure memory area. According to some embodiments of the present disclosure, the security module 213 may request the second control module 220 to analyze the whole of the obtained living body data. In the case where living body data is distributed to the security module 213 and the second control module 220 for analysis, the security module 213 may perform an additional operation for collecting stored analysis results.

In operation 470, the security module 213 may determine whether living body recognition is successfully performed. For example, in the case where living body data is fingerprint, in operation 470, the security module 213 may determine whether an analysis result corresponds to a registered fingerprint of a user. Whether recognition is successfully performed may be determined in operation 470, and the security module 213 may provide the determination result to the normal module 211.

In the case where recognition is successfully performed, in operation 480, the normal module 211 may determine a user as a rightful user by using a result provided from the security module 213 and may authorize the user. However, in the case where recognition is not successfully performed, the normal module 211 may reject the user (e.g., maintaining a lock state, denying payment, or the like) in operation 490, or the process may proceed to operation 450 to allow a user to input living body data again. In the case of failing in recognizing living body data continuously over a certain frequency (e.g., five times), the normal module 211 may be changed into a lock state during a certain time (e.g., one hour) or may prohibit living body recognition.

Figure 5:
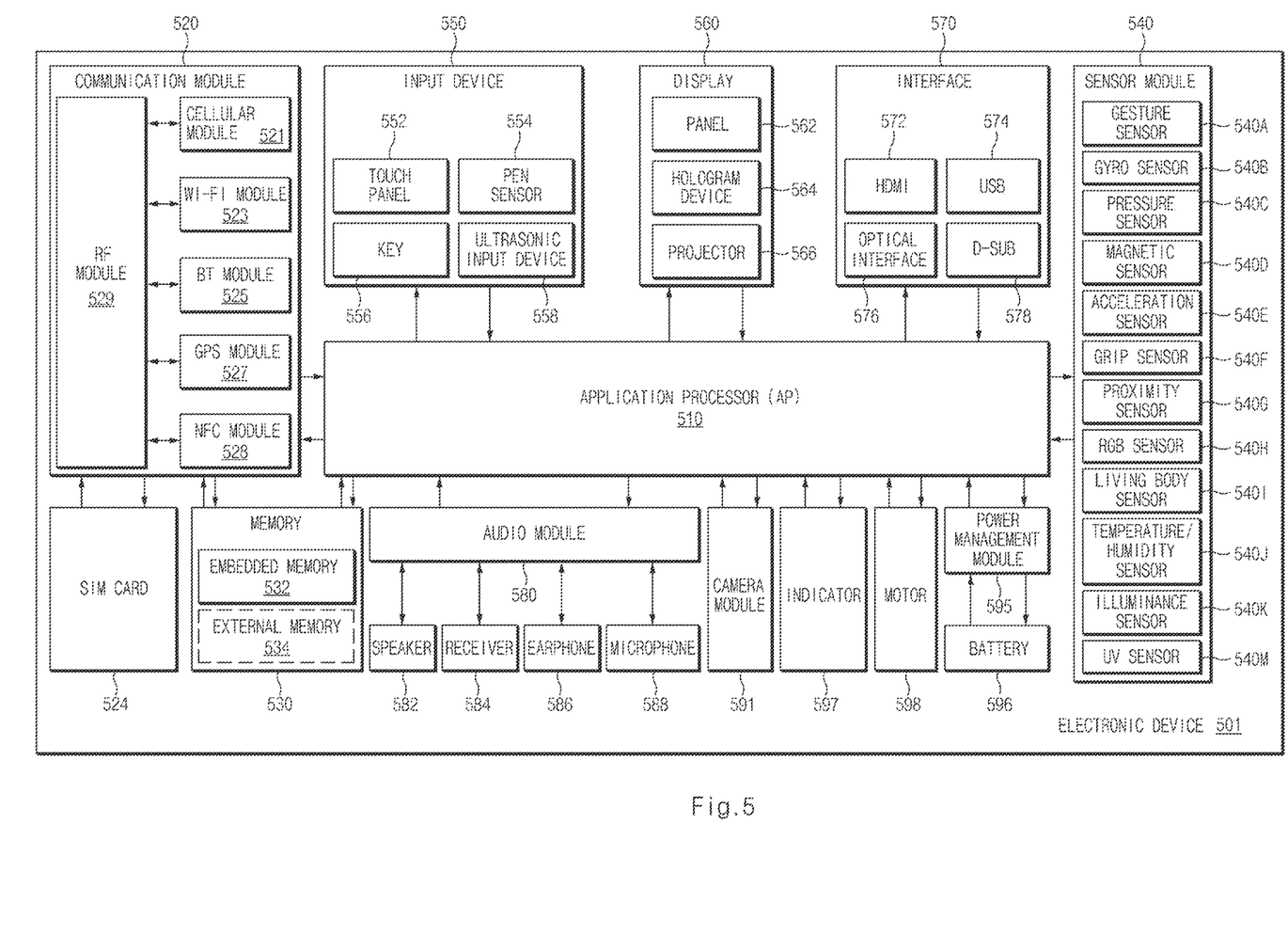
FIG. 5 is a block diagram illustrating an electronic device according to various embodiments of the present disclosure.

FIG. 5 is a block diagram illustrating an electronic device according to various embodiments of the present disclosure.

Referring to FIG. 5, an electronic device 501 may include all or a part of an electronic device 101 illustrated in FIG. 1. The electronic device 501 may include one or more AP 510, a communication module 520, a subscriber identification module (SIM) card 524, a memory 530, a sensor module 540, an input device 550, a display 560, an interface 570, an audio module 580, a camera module 591, a power management module 595, a battery 596, an indicator 597, and a motor 598.

The AP 510 may drive, for example, an OS or an application to control a plurality of hardware or software components connected to the AP 510 and may process and compute a variety of data including multimedia data. The AP 510 may be implemented with an SoC, for example. According to an embodiment of the present disclosure, the AP 510 may further include a GPU (not illustrated) and/or an image signal processor. The communication module 520 may include a part (e.g., a cellular module 521) of components illustrated in FIG. 5. The AP 510 may load instructions or data, received from at least one of other components (e.g., a nonvolatile memory), onto a volatile memory and may store various data at a nonvolatile memory.

According to various embodiments of the present disclosure, the AP 510 may be understood as including a first processor 120 (e.g., a CPU) and a second processor 180 (e.g., a GPU) of FIG. 1. According to various embodiments of the present disclosure, the AP 510 may include a plurality of control modules (or a plurality of APs different from each other). One of the control modules may correspond to the first control module 210 including a normal module and a security module, and at least one another control module may correspond to the second control module 220.

The communication module 520 may be configured to be the same as or similar to the communication interface 170 illustrated in FIG. 1. The communication module 520 may include a cellular module 521, a wireless-fidelity (Wi-Fi) module 523, a Bluetooth (BT) module 525, a GPS module 527, a near field communication (NFC) module 528, and a radio frequency (RF) module 529.

The cellular module 521 may provide voice communication, video communication, a character service, an Internet service, and the like through a communication network. According to an embodiment of the present disclosure, the cellular module 521 may perform discrimination and authentication of the electronic device 501 within a communication network using a subscriber identification module (e.g., a SIM card 524), for example. According to an embodiment of the present disclosure, the cellular module 521 may perform at least a portion of functions that the AP 510 provides. According to an embodiment of the present disclosure, the cellular module 521 may include a CP.

Each of the Wi-Fi module 523, the BT module 525, the GPS module 527, and the NFC module 528 may include a processor for processing data exchanged through a corresponding module, for example. According to various embodiments of the present disclosure, at least a portion (e.g., two or more components) of the cellular module 521, the Wi-Fi module 523, the BT module 525, the GPS module 527, and the NFC module 528 may be included within one integrated circuit (IC) or an IC package.

The RF module 529 may transmit and receive data, for example, a communication signal (e.g., an RF signal). The RF module 529 may include a transceiver, a power amplifier module (PAM), a frequency filter, low noise amplifier (LNA), an antenna, or the like. According to various embodiments of the present disclosure, at least one of the cellular module 521, the Wi-Fi module 523, the BT module 525, the GPS module 527, or the NFC module 528 may transmit and receive an RF signal through a separate RF module.

The SIM card 524 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 530 (e.g., the memory 130) may include an embedded memory 532 or an external memory 534. For example, the embedded memory 532 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 534 may include a flash drive, for example, compact flash (CF), secure digital (SD), micro secure digital (Micro-SD), mini secure digital (Mini-SD), extreme digital (xD) or a memory stick. The external memory 534 may be functionally and/or physically connected to the electronic device 501 through various interfaces.

The sensor module 540 may measure a physical quantity or may detect an operation state of the electronic device 501. The sensor module 540 may convert the measured or detected information to an electric signal. Generally or additionally, the sensor module 540 may include at least one of a gesture sensor 540A, a gyro sensor 540B, a pressure sensor 540C, a magnetic sensor 540D, an acceleration sensor 540E, a grip sensor 540F, a proximity sensor 540G, a color sensor 540H (e.g., red, green, blue (RGB) sensor), a living body sensor 540I, a temperature/humidity sensor 540J, an illuminance sensor 540K, or an UV sensor 540M. Although not illustrated, additionally or generally, the sensor module 540 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, a fingerprint sensor, and the like. The sensor module 540 may further include a control circuit for controlling at least one or more sensors included therein. According to various embodiments of the present disclosure, the electronic device 501 may further include a processor which is a part of the AP 510 or which is distinct from the AP 510 and is configured to control the sensor module 540. The processor may control the sensor module 540 when the AP 510 remains at a sleep state.

The input device 550 may include a touch panel 552, a (digital) pen sensor 554, a key 556, or an ultrasonic input unit 558. The touch panel 552 may use at least one of capacitive, resistive, infrared and ultrasonic detecting methods. In addition, the touch panel 552 may further include a control circuit. The touch panel 552 may further include a tactile layer. In this case, the touch panel 552 may provide a tactile reaction to a user.

The (digital) pen sensor 554 may be a part of a touch panel or may include a separate sheet for recognition. The key 556 may include, for example, a physical button, an optical key, a keypad, and the like. The ultrasonic input device 558, which is an input device for generating an ultrasonic signal, may enable the electronic device 501 to detect a sound wave through a microphone (e.g., a microphone 588) so as to identify data.

The display 560 (e.g., the display 160) may include a panel 562, a hologram device 564, or a projector 566. The panel 562 may be configured to be the same as or similar to the display 160 illustrated in FIG. 1. The panel 562 may be, for example, flexible, transparent or wearable. The panel 562 and the touch panel 552 may be integrated into a single module. The hologram device 564 may display a stereoscopic image in a space using a light interference phenomenon. The projector 566 may project light onto a screen so as to display an image. The screen may be arranged in the inside or the outside of the electronic device 501. According to an embodiment of the present disclosure, the display 560 may further include a control circuit for controlling the panel 562, the hologram device 564, or the projector 566.

The interface 570 may include, for example, a high-definition multimedia interface (HDMI) 572, a universal serial bus (USB) 574, an optical interface 576, or a D-sub-miniature (D-sub) 578. The interface 570 may be included, for example, in the communication interface 170 illustrated in FIG. 1. Additionally or generally, the interface 570 may include, for example, a mobile high definition link (MHL) interface, an SD card/multi-media card (MMC) interface, or an infrared data association (IrDA) standard interface.

The audio module 580 may convert a sound and an electric signal in dual directions. At least a portion of the audio module 580 may be included, for example, in an input/output interface 150 illustrated in FIG. 1. The audio module 580 may process, for example, sound information that is input or output through a speaker 582, a receiver 584, an earphone 586, or a microphone 588.

The camera module 591 for shooting a still image or a video may include, for example, at least one image sensor (e.g., a front sensor or a rear sensor), a lens (not illustrated), an image signal processor (ISP, not illustrated), or a flash (e.g., an LED or a xenon lamp, not illustrated).

The power management module 595 may manage, for example, power of the electronic device 501. According to an embodiment of the present disclosure, a power management integrated circuit (PMIC) a charger IC, or a battery or fuel gauge may be included in the power management module 595. The PMIC may have a wired charging method and/or a wireless charging method. The wireless charging method may include, for example, a magnetic resonance method, a magnetic induction method or an electromagnetic method, and may further include a coil loop, a resonant circuit, a rectifier, and the like. The battery gauge may measure, for example, a remaining capacity of the battery 596 and a voltage, current or temperature thereof while the battery is charged. The battery 596 may include, for example, a rechargeable battery or a solar battery.

The indicator 597 may display a specific state of the electronic device 501 or a part thereof (e.g., the AP 510), such as a booting state, a message state, a charging state, and the like. The motor 598 may convert an electrical signal into a mechanical vibration and may generate vibration or a haptic effect. Although not illustrated, a processing device (e.g., a GPU) for supporting a mobile TV may be included in the electronic device 501. The processing device for supporting a mobile TV may process media data according to the standards of DMB, digital video broadcasting (DVB) or media flow.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 6:
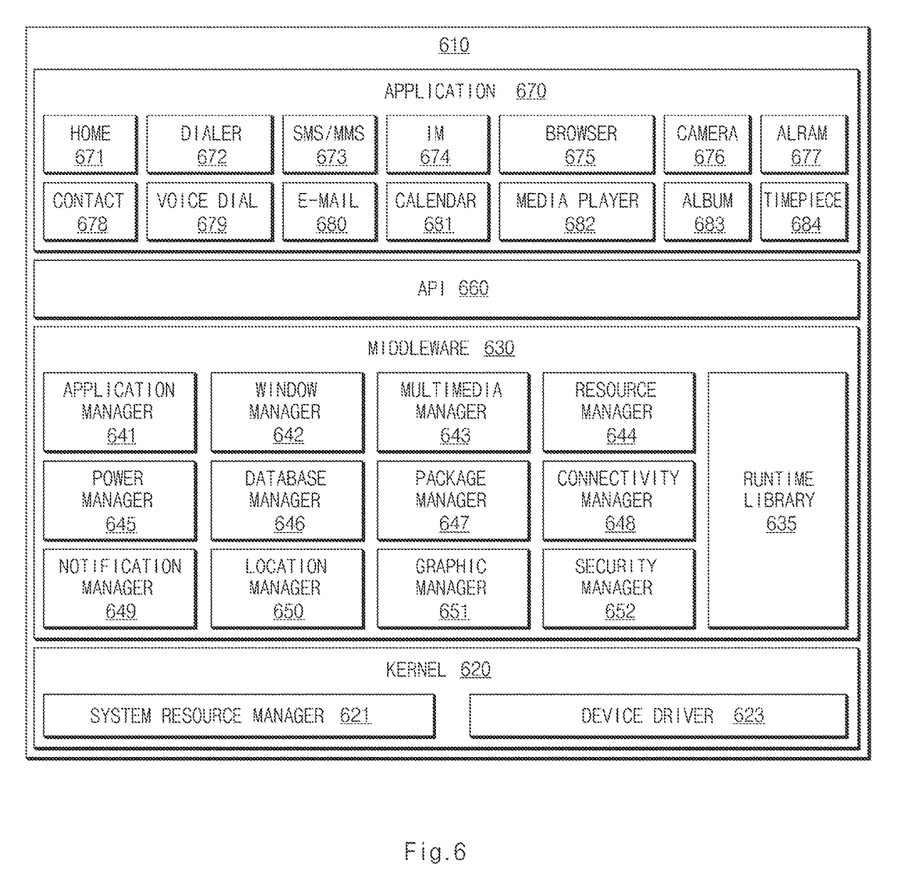
FIG. 6 is a block diagram schematically illustrating a program module, according to various embodiments of the present disclosure.

FIG. 6 illustrates a block diagram schematically illustrating a program module, according to various embodiments of the present disclosure.

Referring to FIG. 6, according to an embodiment of the present disclosure, a program module 610 (e.g., the program 140) may include an OS to control resources associated with an electronic device (e.g., the electronic device 101), and/or diverse applications (e.g., the application program 147) driven on the OS. The OS may be, for example, android, iOS, windows, symbian, tizen, or bada.

The program module 610 may include a kernel 620, a middleware 630, an application programming interface (API) 660, and/or an application 670. At least a part of the program module 610 may be preloaded on an electronic device or may be downloadable from a server (e.g., the server 106).

The kernel 620 (e.g., the kernel 141 of FIG. 1) may include, for example, a system resource manager 621 or a device driver 623. The system resource manager 621 may perform control, allocation, or retrieval of system resources. According to an embodiment of the present disclosure, the system resource manager 621 may include a process managing part, a memory managing part, or a file system managing part. The device driver 623 may include, for example, a display driver, a camera driver, a Bluetooth driver, a common memory driver, a USB driver, a keypad driver, a Wi-Fi driver, an audio driver, or an inter-process communication (IPC) driver.

The middleware 630 may provide, for example, a function which the application 670 needs in common, or may provide diverse functions to the application 670 through the API 660 to allow the application 670 to efficiently use limited system resources of the electronic device. According to an embodiment of the present disclosure, the middleware 630 (e.g., the middleware 143) may include at least one of a runtime library 635, an application manager 641, a window manager 642, a multimedia manager 643, a resource manager 644, a power manager 645, a database manager 646, a package manager 647, a connectivity manager 648, a notification manager 649, a location manager 650, a graphic manager 651, or a security manager 652.

The runtime library 635 may include, for example, a library module which is used by a compiler to add a new function through a programming language while the application 670 is being executed. The runtime library 635 may perform input/output management, memory management, or capacities about arithmetic functions.

The application manager 641 may manage, for example, a life cycle of at least one application of the application 670. The window manager 642 may manage a GUI resource which is used in a screen. The multimedia manager 643 may identify a format necessary for playing diverse media files, and may perform encoding or decoding of media files by using a codec suitable for the format. The resource manager 644 may manage resources, such as a storage space, memory, or source code of at least one application of the application 670.

The power manager 645 may operate, for example, with a basic input/output system (BIOS) to manage a battery or power, and may provide power information for an operation of an electronic device. The database manager 646 may generate, search for, or modify database which is to be used in at least one application of the application 670. The package manager 647 may install or update an application which is distributed in the form of package file.

The connectivity manager 648 may manage, for example, wireless connection, such as Wi-Fi or Bluetooth. The notification manager 649 may display or notify an event, such as an arrival message, a promise, a proximity notification, and the like, in a mode that does not disturb a user. The location manager 650 may manage location information of an electronic device. The graphic manager 651 may manage a graphic effect that is provided to a user, or manage a user interface relevant thereto. The security manager 652 may provide a general security function necessary for system security or user authentication. According to an embodiment of the present disclosure, in the case where an electronic device (e.g., an electronic device 101) includes a telephony function, the middleware 630 may further includes a telephony manager for managing a voice or video call function of the electronic device.

The middleware 630 may include a middleware module that combines diverse functions of the above-described components. The middleware 630 may provide a module specialized to each OS kind to provide differentiated functions. Additionally, the middleware 630 may remove a part of the preexisting components, dynamically, or may add a new component thereto.

The API 660 (e.g., an API 145) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 670 (e.g., the application program 147) may include, for example, one or more applications capable of providing functions for a home 671, a dialer 672, an short message service (SMS)/multimedia messaging service (MMS) 673, an instant message (IM) 674, a browser 675, a camera 676, an alarm 677, a contact 678, a voice dial 679, an e-mail 680, a calendar 681, a media player 682, an album 683, and a timepiece 684, or for offering health care (e.g., measuring an exercise quantity or blood sugar) or environment information (e.g., atmospheric pressure, humidity, or temperature).

According to an embodiment of the present disclosure, the application 670 may include an application (hereinafter referred to as "information exchanging application" for descriptive convenience) to support information exchange between the electronic device (e.g., an electronic device 101) and an external electronic device (e.g., the first external electronic device 102 or the second external electronic device 104). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., the first external electronic device 102 or the second external electronic device 104). Additionally, the information exchanging application may receive, for example, notification information from an external electronic device and provide the notification information to a user. The device management application may manage (e.g., install, delete, or update), for example, at least one function (e.g., turn-on/turn-off of an external electronic device itself (or a part of components) or adjustment of brightness (or resolution) of a display) of the external electronic device (e.g., an electronic device 104) which communicates with the electronic device, an application running in the external electronic device, or a service (e.g., a call service or a message service) provided from the external electronic device.

According to an embodiment of the present disclosure, the application 670 may include an application (e.g., a health care application) which is assigned in accordance with an attribute (e.g., an attribute of a mobile medical device as a kind of electronic device) of the external electronic device (e.g., the first external electronic device 102 or the second external electronic device 104). According to an embodiment of the present disclosure, the application 670 may include an application which is received from an external electronic device (e.g., the server 106 or the first external electronic device 102 or the second external electronic device 104). According to an embodiment of the present disclosure, the application 670 may include a preloaded application or a third party application which is downloadable from a server. The component titles of the program module 610 according to the embodiment of the present disclosure may be modifiable depending on kinds of OSs.

According to various embodiments of the present disclosure, at least a part of the program module 610 may be implemented in software, firmware, hardware, or a combination of at least two or more combinations thereof. At least a part of the program module 610 may be implemented (e.g., executed), for example, by a processor (e.g., an AP 510). At least a part of the program module 610 may include, for example, a module, a protein, a set of instructions, or a process for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a computer-readable storage media in the form of a programmable module. The instruction, when executed by one or more processors (e.g., a first processor 120), may perform a function corresponding to the instruction. The computer-readable storage media, for example, may be the memory 130.

For example, according to various embodiments of the present disclosure, a storage medium which includes an instruction readable by a computer may include (store) an instruction for executing various methods. For example, the instruction may cause the first control module to set a secure memory, to determine validity of the secure memory, to write secure data at the secure memory, and to request the second control module to process at least a portion of the written secure data, the second control module to write a processing result on the at least a portion of the secure data at the secure memory, and the security module to provide a control signal, based on the processing result, to the normal module.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. In addition, a portion of operations may be executed in different sequences, omitted, or other operations may be added.

According to various embodiments of the present disclosure, it may be possible to quickly process secure data, such as living body data of a user while maintaining a high secure state.

Furthermore, as validity of a secure memory area is determined, secure data may be stably processed even though an area or module of an electronic device is hacked, thereby preventing leakage of secure data.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a first processor including a normal module and a security module; and
a second processor distinct from the first processor,
wherein the normal module is configured to set a secure memory which is accessible by the security module and the second processor, and
wherein the security module is configured to determine validity of the secure memory.

2. The electronic device of claim 1, wherein the secure memory comprises an input buffer at which secure data is written.

3. The electronic device of claim 1, wherein the secure memory comprises an output buffer at which a processing result of secure data is written.

4. The electronic device of claim 1, wherein the secure memory is configured to:
operate as an input buffer at which secure data is written, and
operate as an output buffer at which a processing result of secure data is written after the secure data is read.

5. The electronic device of claim 2, wherein the security module is configured to:
write the secure data at the input buffer, and
request the second module to process a portion or a whole of the secure data.

6. The electronic device of claim 5, wherein the security module is configured to provide the second processor with a memory address of the input buffer and a memory address, at which a processing result on the portion or the whole of the secure data is to be written, together with the request.

7. The electronic device of claim 6, wherein the security module is configured to provide the second processor with the request and the memory address through the normal module.

8. The electronic device of claim 5, wherein the second processor is further configured to provide a response to the request to the security module.

9. The electronic device of claim 8, wherein the second processor is further configured to provide the response to the security module through the normal module.

10. The electronic device of claim 8, wherein the second processor is further configured to provide a memory address of an output buffer together with the response.

11. The electronic device of claim 8, wherein the second processor is further configured to provide a memory address of an output buffer at which the processing result is written, together with the response.

12. The electronic device of claim 5,
wherein the second processor further comprises a cache memory, and
wherein, in response to receiving the request, the second processor is further configured to:
logically divide the cache memory into two or more memory areas, and
perform the processing using at least one of the logically divided memory areas.

13. The electronic device of claim 5,
wherein the second processor further comprises a cache memory, and
wherein the second processor is further configured to clear the cache memory after performing the processing.

14. The electronic device of claim 1,
wherein the first processor comprises a central processing unit (CPU), and
wherein the second processor comprises at least one of a graphics processing unit (GPU), a digital signal processor (DSP), a field-programmable gate array (FPGA), a sensor core, or a CPU distinguishable from the CPU.

15. The electronic device of claim 1, wherein the first processor and the second processor are implemented in one system on chip (SoC).

16. A secure data processing method of an electronic device which includes a first processor and a second processor, the first processor including a normal module and a security module distinguishable from each other, the method comprising:
   setting a secure memory by the normal module;
   determining validity of the secure memory by the security module;
   writing secure data at the secure memory;
   requesting the second processor to process a portion or a whole of the written secure data;
   writing a processing result on the portion or the whole of the secure data at the secure memory; and
   providing a control signal, based on the processing result, to the normal module by the security module.

17. The method of claim 16,
   wherein the secure memory comprises an input buffer at which the secure data is written and an output buffer having an address different from the input buffer, and
   wherein the requesting of the second processor comprises:
      providing memory addresses of the input buffer and the output buffer to the second processor together with the request.

18. The method of claim 16, wherein the providing of the control signal comprises:
   comparing a processing result written at the memory with registered user information; and
   providing the normal module with a control signal permitting user authentication, if the processing result corresponds to the user information, and providing the normal module with a control signal not permitting the user authentication, if the processing result does not correspond to the user information.

19. The method of claim 18,
   wherein the secure data comprises fingerprint or iris image of a user, and
   wherein the control signal comprises a signal for releasing a lock state of the electronic device or permitting a payment using the fingerprint or iris image.

20. A non-transitory computer readable recording medium for storing instructions readable by at least one processor, the instructions being executed by a first processor and a second processor, the first processor including a normal module and a security module distinguishable from each other, and the instruction causing:
   setting a secure memory by the normal module;
   determining validity of the secure memory by the security module;
   writing secure data at the secure memory;
   requesting the second processor to process a portion or a whole of the written secure data;
   writing a processing result on the portion or the whole of the secure data at the secure memory; and
   providing a control signal, based on the processing result, to the normal module by the security module.

* * * * *